(12) United States Patent
Juneja et al.

(10) Patent No.: US 11,748,630 B1
(45) Date of Patent: Sep. 5, 2023

(54) OPTIMIZED SUBSCRIPTION ACCESS PLATFORM USING DNA COMPUTING

(71) Applicant: Bank of America Corporation, Charlotte, NC (US)

(72) Inventors: Kapil Juneja, Jaipur (IN); Rajalakshmi Arumugam, Chennai (IN); Venkatesh Polneedi, Hyderabad (IN); Siddharth Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/956,381

(22) Filed: Sep. 29, 2022

(51) Int. Cl.
*G06N 3/12* (2023.01)
*H04L 9/32* (2006.01)
*G06N 3/123* (2023.01)

(52) U.S. Cl.
CPC ........... *G06N 3/123* (2013.01); *H04L 9/3213* (2013.01)

(58) Field of Classification Search
CPC ......... H04L 63/10; H04L 67/06; H04L 67/50; H04L 69/26; G06N 3/002; G06N 3/12–123
See application file for complete search history.

(56) References Cited

U.S. PATENT DOCUMENTS

| | | | | |
|---|---|---|---|---|
| 7,831,457 B2* | 11/2010 | Varadarajan | ..... | G06Q 10/06398 705/7.33 |
| 10,796,014 B2* | 10/2020 | Milman | ................. | G06F 21/10 |
| 11,294,990 B2* | 4/2022 | Todd | ....................... | G06F 21/64 |
| 2015/0317490 A1* | 11/2015 | Carey | ................. | G06F 21/6227 726/26 |
| 2022/0069996 A1* | 3/2022 | Xue | ...................... | H04L 9/3239 |
| 2022/0383137 A1* | 12/2022 | Singh | ................. | G06Q 30/0202 |
| 2023/0031817 A1* | 2/2023 | Mulas | .................. | G07G 1/0054 |
| 2023/0222313 | * | 7/2023 | Ezrielev | ................ | G06N 3/002 711/154 |

OTHER PUBLICATIONS

Xie et al., "DNA circuits compatible encoder and demultiplexer based on a single biomolecular platform with DNA strands as outputs", Oxford Academic (Year: 2022).*
SynBioBeta "So You Want to Sell Your Genome As an NFT? Read This First", SynBioBeta (Year: 2021).*

* cited by examiner

*Primary Examiner* — Boris D Grijalva Lobos
(74) *Attorney, Agent, or Firm* — Weiss & Arons LLP

(57) ABSTRACT

Systems, methods, and apparatus are provided for integrating access to third-party data using DNA computing. Requests for third-party data may be received from a plurality of applications. The request structure may be tagged with an NFT, linking the request to the originating application. DNA strands may be synthesized from the request structures and clustered based on the encoded attributes. A DNA cluster may be converted to digital data to generate an integrated request structure. Machine learning models may generate an extraction schedule using update information for each third-party vendor. A bot array may apply license credentials to access the vendors and execute an integrated request. An integrated response structure generated from extracted subscription data may be mapped back to the DNA strands. The DNA strands may be decoded to identify the original requests and responses may be transmitted to the originating applications using the NFT linkage associated with the requests.

20 Claims, 5 Drawing Sheets

OPTIMIZED SUBSCRIPTION ACCESS PLATFORM USING DNA COMPUTING

FIELD OF TECHNOLOGY

Aspects of the disclosure relate to DNA-based data storage.

BACKGROUND OF THE DISCLOSURE

An enterprise may rely on data sourced both internally and externally. Data from external market sources may be sourced using license-based usage packages. Licenses may have a variety of structures and may charge at the user level and/or the usage level. Payment may be required for the initial license as well for units of data drawn.

Effective use of a data license may vary across enterprise users. Some users may draw large amounts of data, while others may use only a fraction of the data available under the license terms. In addition, multiple users may request identical or similar data, resulting in enterprise costs for redundant extraction of third-party data.

It would be desirable to stream data requests through a single platform configured to optimize access to subscription services and improve the speed and efficiency of requests for external data. It would be desirable to integrate DNA-based computing and data storage to improve processing speed and storage capabilities while maintaining unique identifiers for each request.

SUMMARY OF THE DISCLOSURE

Systems, methods, and apparatus are provided for integrating access to third-party data using DNA computing.

A streaming pipeline may receive requests for third-party data from a plurality of applications. A nonfungible token (NFT) may be minted linking the request to the originating application. The request structure may be tagged with the NFT.

A DNA strand may be synthesized from each request structure. The DNA strands may be clustered based on the encoded attributes. A DNA cluster may be converted to digital data to generate an integrated request structure.

Machine learning models may determine a data update schedule for a third-party vendor and flag attributes with the update frequency. The update frequency and the integrated request schedule may be used to generate an extraction schedule. A bot array may use the license information to access the vendor and extract the data.

An integrated response structure may be generated from subscription data extracted in accordance with the integrated request structure. The integrated response structure may be mapped back to the DNA strands corresponding to the original requests. The DNA strands may be decoded to identify the original requests. The streaming pipeline may transmit responses to the applications using the NFT linkage associated with the requests.

The DNA computing platform is a practical application that uses a range of technical features to improve processing efficiency. The system may leverage the high parallelism of the DNA synthesis and clustering processes to generate an integrated request structure that eliminates duplicate requests. Specific improvements such as machine learning based extraction scheduling improve data quality by ensuring that the integrated request structure is synchronized with vendor updates. NFT-based linkage ensures accurate mapping of the integrated requests.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
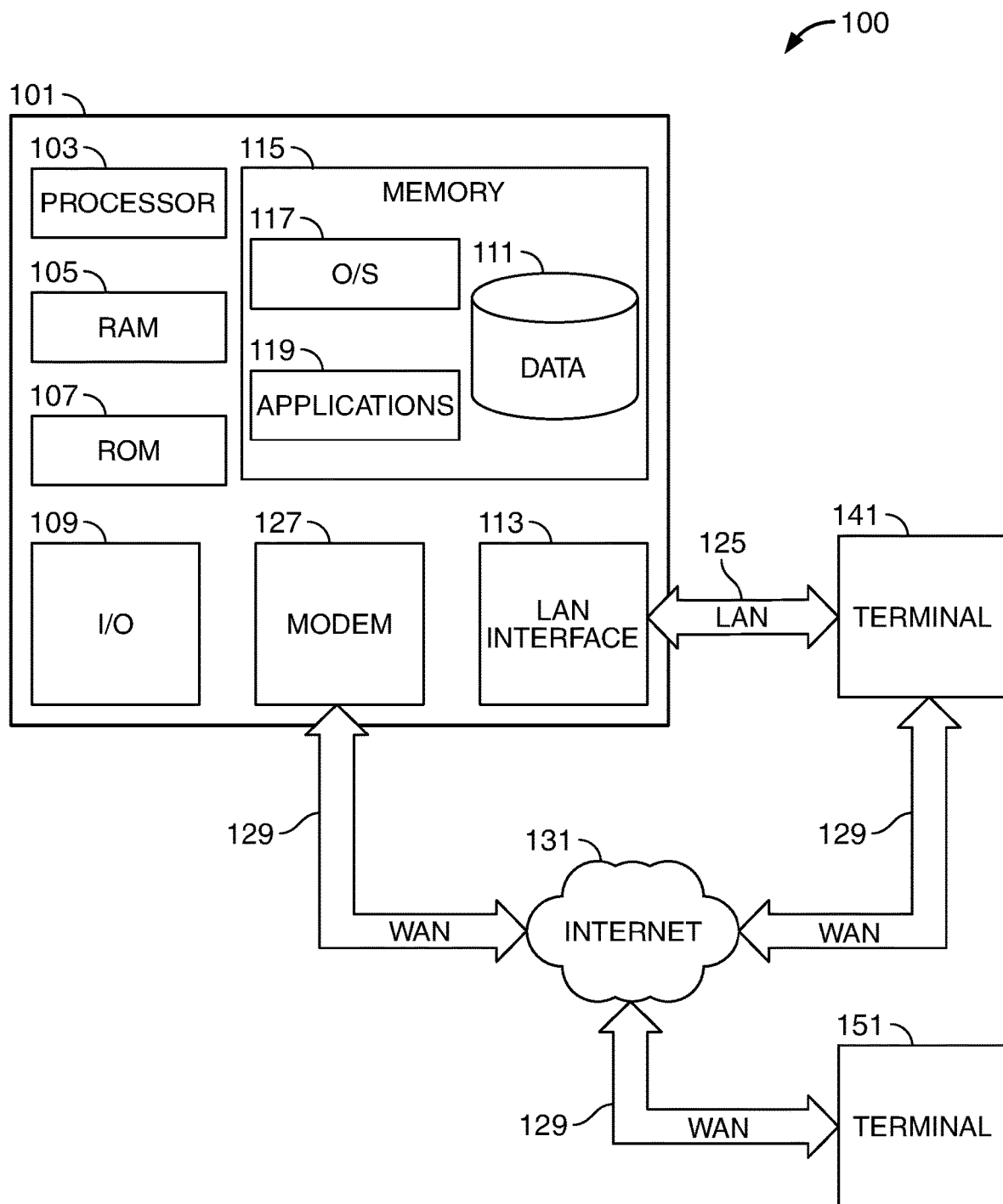
FIG. 1 shows illustrative apparatus in accordance with principles of the disclosure.

Systems, methods, and apparatus are provided for integrating access to third-party data using DNA computing.

For the sake of illustration, the invention will be described as being performed by a "system." The system may include one or more features of apparatus and methods that are described herein and/or any other suitable device or approach.

An enterprise may source data from one or more external vendors with license-based usage packages. Licenses may have a variety of structures and may involve charges at the user level and/or the usage level. Conventionally, individual users access the vendors directly through a web-based portal or via any suitable method.

An intermediary subscription access platform may streamline requests to improve the speed and efficiency of the system. The platform may use DNA-based storage to track unique requests along with clustering and bot-based scheduling to eliminate duplicate requests and improve access to current data.

The system may include multiple internal enterprise applications. The applications may require data from external third-party vendors. An application may send a request for third party data to a streaming processor. The streaming processor may be a cloud-based pipeline.

A request received from an application may include combinations of attributes and/or values, multi-page or multi-type documents, images, charts, or any suitable data. The digital request structure may include the attributes, values, or documents required.

The system may tag each request received at the streaming processor. The heterogenous nature of the requests received at the streaming processor makes it difficult to apply a conventional identifier that captures each unique request. The system may use a non-fungible token (NFT) generator to mint a unique token that links the request to the originating application.

The system may transmit each request tagged with an NFT to an integrated DNA computing platform. Each request tagged with an NFT may be assigned a DNA structure.

In digital data storage, data is stored as binary digits. DNA data storage involves generating synthetic DNA molecules that encode the digital data. Deoxyribonucleic acid (DNA) is a polymer composed of two polynucleotide chains that coil around each other to form a double helix. In DNA data storage, the four nucleotide bases (adenine (A), guanine (G), cytosine (C), and thymine (T)) encode the binary digits. Binary code may be translated into DNA code using one or more algorithms.

The DNA molecules may be synthesized using chemical processes, enzyme-based approaches, photolithography, or by any suitable method. DNA sequences may be stored on a silicon chip or in any suitable medium. The DNA synthesis process may be highly parallelized.

DNA data is more compact than binary data and may be stored more densely than traditional computer-drive based storage. In addition to high capacity, DNA data storage provides a longer lifespan and decreased susceptibility to technical and electrical failures.

In some embodiments, the DNA computing platform may also include bio-processors in which biological molecules such as DNA are used to perform computations. DNA processing may also be highly parallelized.

The DNA computing platform may synthesize a strand of DNA for each request. The DNA strands may include short sequences of n-number of bases. The sequence may depend on number and type of attributes present in the request structure. The DNA computing platform may generate DNA strands for each request in parallel, improving processing speed and efficiency. In some embodiments, the system may recognize that a request is repetitive and assign a previously generated DNA strand to the request.

The DNA computing platform may perform clustering on the DNA strands. The system may use a combination of clustering algorithms to derive meaningful relationships between the encoded request attributes. The system may use any suitable machine learning based classification algorithms.

The highly parallelized processing of the DNA system may iteratively perform calculations in a self-learning mode to improve the quality of the clustering.

Data clustering may consolidate requests for the same data or subset of data. In some cases, there may be slight variances in the data requested by the various applications. After the clustering, the resulting structure may contain only the unique set of attributes needed from the external vendors.

The clustering may be used to generate an integrated request structure for each of the vendors. The integrated request structure may include the attributes consolidated from the requests. Related attributes may be grouped and redundant attributes from multiple applications requesting the same data may be removed. The integrated request structure may be stored in a renewable DNA storage system. The integrated request structure may be encoded into digital data. The system may include bi-directional utility for converting DNA encoded data to digitally encoded data and vice versa.

Execution of the integrated request may be scheduled to avoid stale data. The system may use machine learning to identify vendor patterns for refreshing data. The system may determine the optimal time for accessing each third-party vendor based on how often the vendor modifies data or accesses new data.

A one time, on-demand service may connect to the various external vendor portals and extract subscription data as allowed under the license. The extraction may be executed at predetermined time intervals.

The system may use a microservice architecture to extract the data. Microservices are a software architecture composed of small independent services that communicate over well-defined APIs. An application may be built as independent components that run each application process as a service. Each microservice many connect to a different third-party vendor. A microservice orchestrator may coordinate the different microservices within the unit.

The data extracted during this one-time process may be input to a first machine learning model. The first machine learning model may determine a pattern of refresh frequency for each attribute. The first machine learning model may flag each attribute with information about how often data is modified or published by the vendor.

The flagged attributes may be input to a second machine learning model. An integrated request structure may also be input to the second machine learning model. The second machine learning model may identify a schedule for accessing a third-party vendor based on the attributes and the information about vendor updates. The schedule may be designed to extract data corresponding to the integrated request structure at times when the data will be freshest.

The machine learning based extraction scheduler may trigger the process for executing requests at the computed date and time. The extraction scheduler may transmit the integrated request structure to a bot-based subscription applicator. The bot-applicator may be programmed with the data usage parameters allowed under the license. The bot-applicator may apply the subscription credentials to connect to the vendor. A separate bot-applicator may be programmed for each subscription service. A bot-orchestrator may manage all the bots.

The bot may use enterprise subscription licenses, connect to a third-party vendor portal, and extract the information for each attribute in the request. The bot may transmit the extracted data back to the DNA storage system as an integrated response. The request history may be stored in DNA-based renewable storage for future reference.

The system may map the integrated response structure containing the extracted subscription data to the DNA strands synthesized from the original requests. The system may decode the DNA strands to identify the original requests. The system may use the NFT linkage tagging a request to identify the originating application. The streaming processor may route the response data for the request to the corresponding application.

One or more non-transitory computer-readable media storing computer-executable instructions are provided. When executed by a processor on a computer system, the instructions perform a method for integrating access to third-party data for a plurality of applications using DNA computing.

The method may include receiving requests for third-party data from a plurality of applications. The method may include tagging each request with an NFT linking the request to a corresponding application.

The method may include for each request, synthesizing a DNA strand encoding one or more attributes associated with the request structure. DNA computing may be applied to cluster the strands of DNA based on the encoded attributes. The cluster of DNA strands may be converted to digital data and a consolidated request structure may be generated from the digital DNA data.

The method may include generating a consolidated response structure. The consolidated response structure may include subscription data extracted from the third-party vendor in accordance with the request structure.

The method may include mapping the consolidated response structure to the DNA strands and decoding the DNA strands to identify individual requests. A response associated with each request may be routed to the originating application based on the NFT linkage tagging the request.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates computing device 101 (alternatively referred to herein as a "server or computer") that may be used in accordance with the principles of the invention. Server 101 may interact with DNA computing apparatus including a DNA processor and/or DNA storage.

Computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with a DNA computing platform, perform power management routines or other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
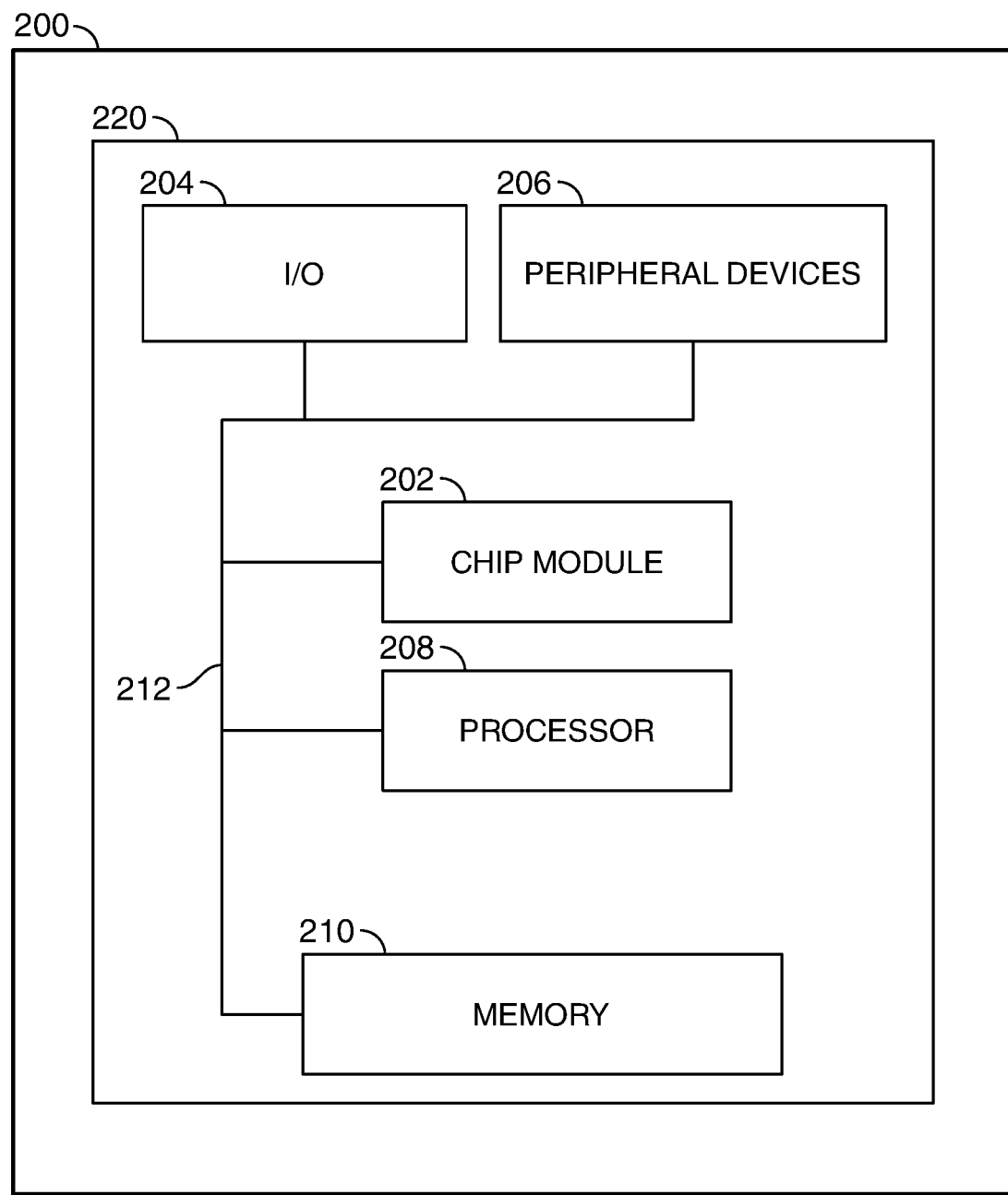
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208; and machine-readable memory 210.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
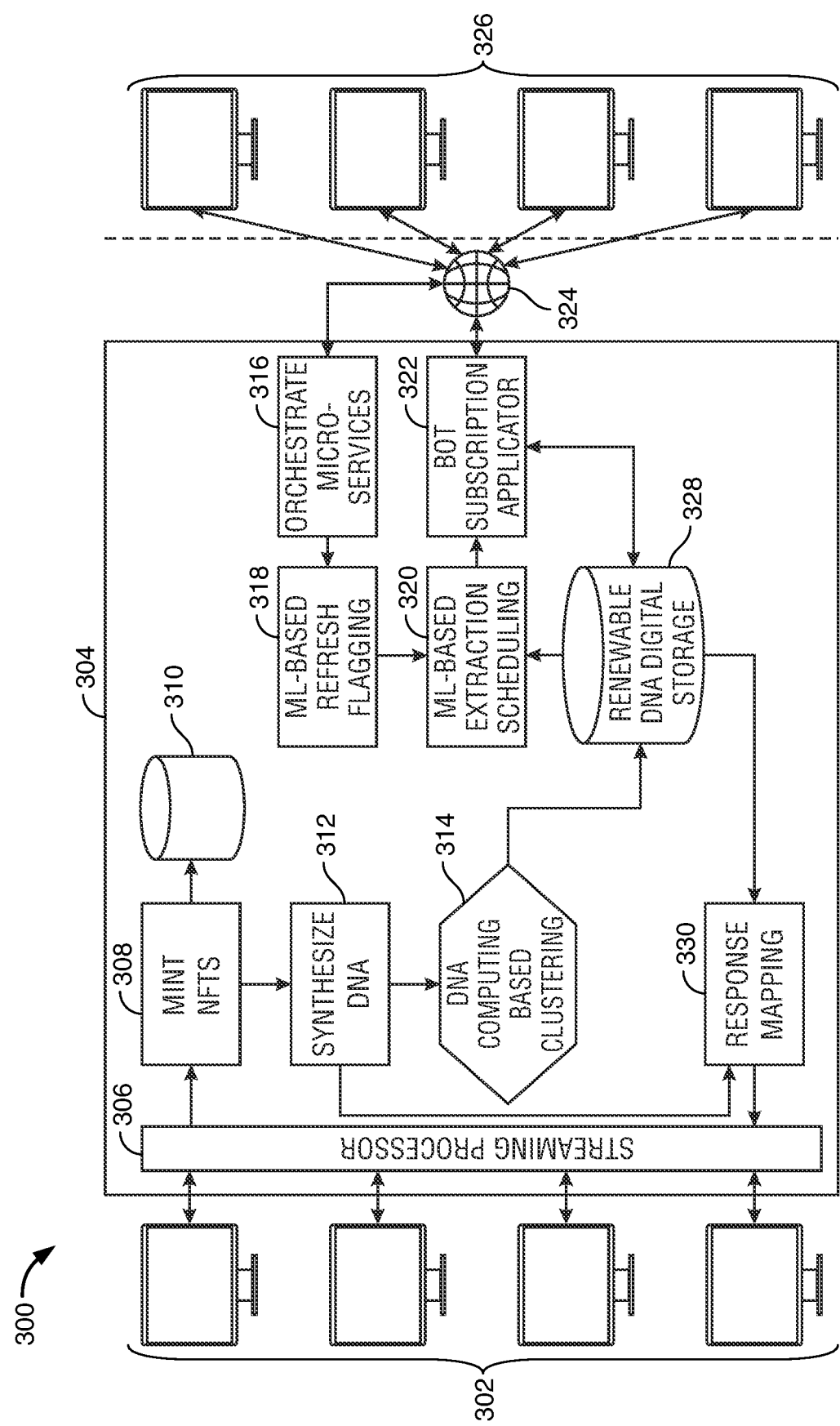
FIG. 3 shows an illustrative process flow in accordance with principles of the disclosure.

FIG. 3 shows process flow 300 for integrating and executing requests for third party data. Requests for data from external third-party vendors may be generated at internal enterprise applications 302.

Intermediary platform 304 may integrate the requests using DNA computing. Streaming pipeline 306 may receive the requests from the applications. Streaming pipeline 306 may process requests continuously or at predetermined intervals. At 308, the platform may mint an NFT and link it to a request. The NFT linkage may be stored in storage 310.

At 312, the platform may synthesize a DNA strand for each tagged request. At 314, the platform may cluster the DNA strands based on the encoded attributes. The clustering may ensure that data is retrieved only once for overlapping requests. At 328, the clustered DNA may be stored in renewable storage and converted to digital data to generate an integrated request structure.

At 316, the platform may include an orchestrator for a suite of microservices. The microservices may include separately accessing each of external vendors 326 via internet 324 at a set of predetermined intervals. At 318, the extracted data may be input to a first machine learning model to identify refresh patterns for different attributes. At 320, attributes flagged with refresh frequency may be input to a second machine learning model along with the integrated request structure. The second machine learning model may output the most efficient extraction schedule for the freshest data.

At 322, a bot subscription applicator may receive the extraction schedule and the integrated request The bot subscription applicator may be configured with credentials to access one of external vendors 326. The bot subscription applicator may execute the integrated request. The extracted data may be stored in DNA digital storage 328 as an integrated response structure.

At 330, the integrated response structure may be mapped to each of the individual requests. The DNA assignments from 312 may be applied to decode the DNA strands and match them to the original digital requests. Streaming pipeline 306 may use the NFT linkage for each request to return the response to the correct application.

Figure 4:
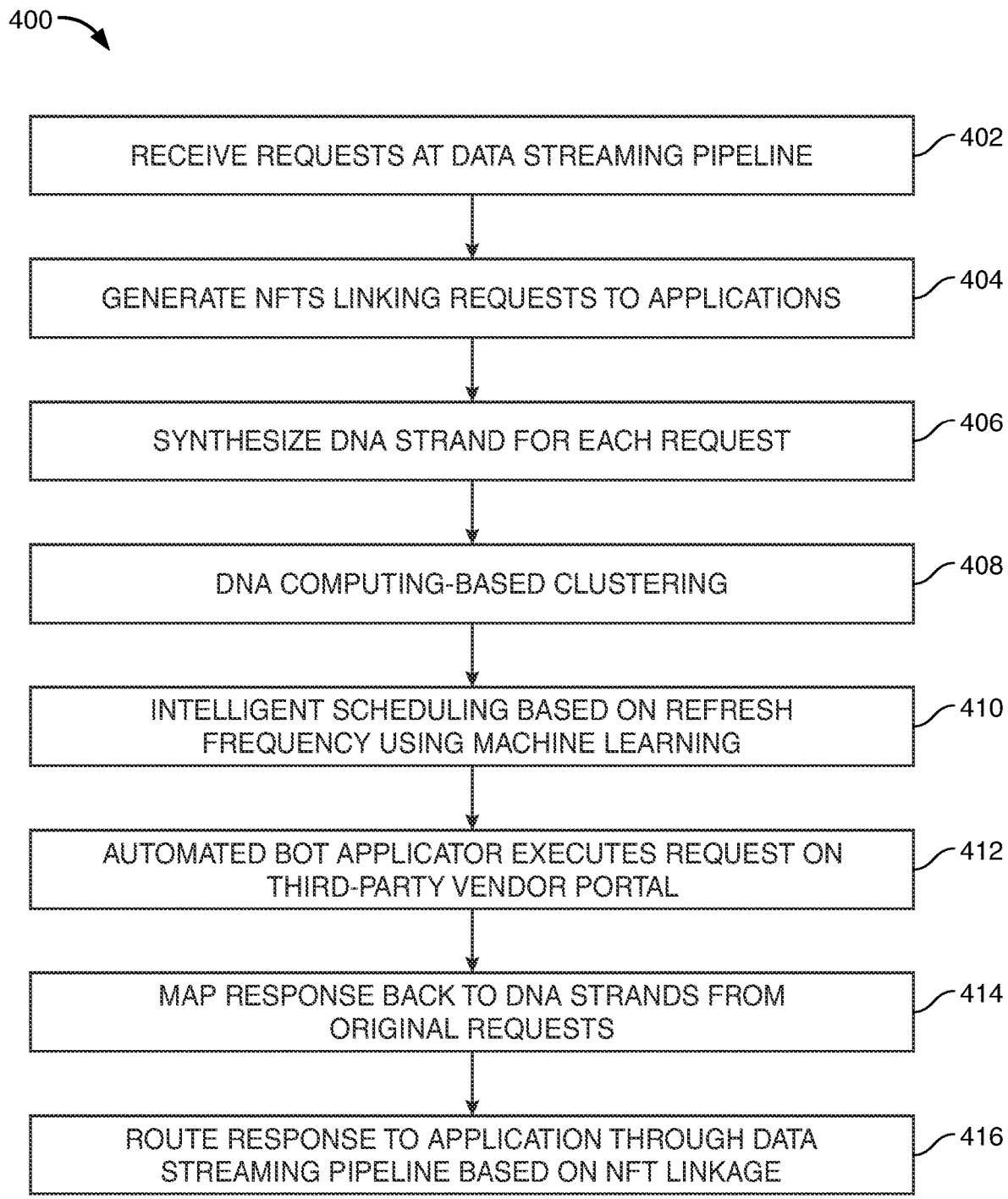
FIG. 4 shows an illustrative process flow in accordance with principles of the disclosure.

FIG. 4 shows illustrative process flow 400 for integrating and executing requests using DNA computing. Elements of process flow 400 may correspond to elements of process flow 300, shown in FIG. 3.

At step 402, a data streaming pipeline may receive requests from multiple applications. At step 404, the system may tag each request with an NFT linking the request to its originating application. At step 406, the system may synthesize a strand of DNA encoding the features of the request structure. At step 408, the system may cluster the strands of DNA based on the encoded attributes and generate an integrated request.

At step 410, the system may use machine learning to schedule the integrated request based on the refresh frequency for different types of data at each vendor. A step 412, an automated bot-applicator may access a third-party vendor portal and execute the integrated request.

At step 414, the integrated request may be mapped back to the individual DNA strands corresponding to the original requests. At step 416, the data streaming pipeline may route a response to an application using the NFT linkage associated with a request.

Figure 5:
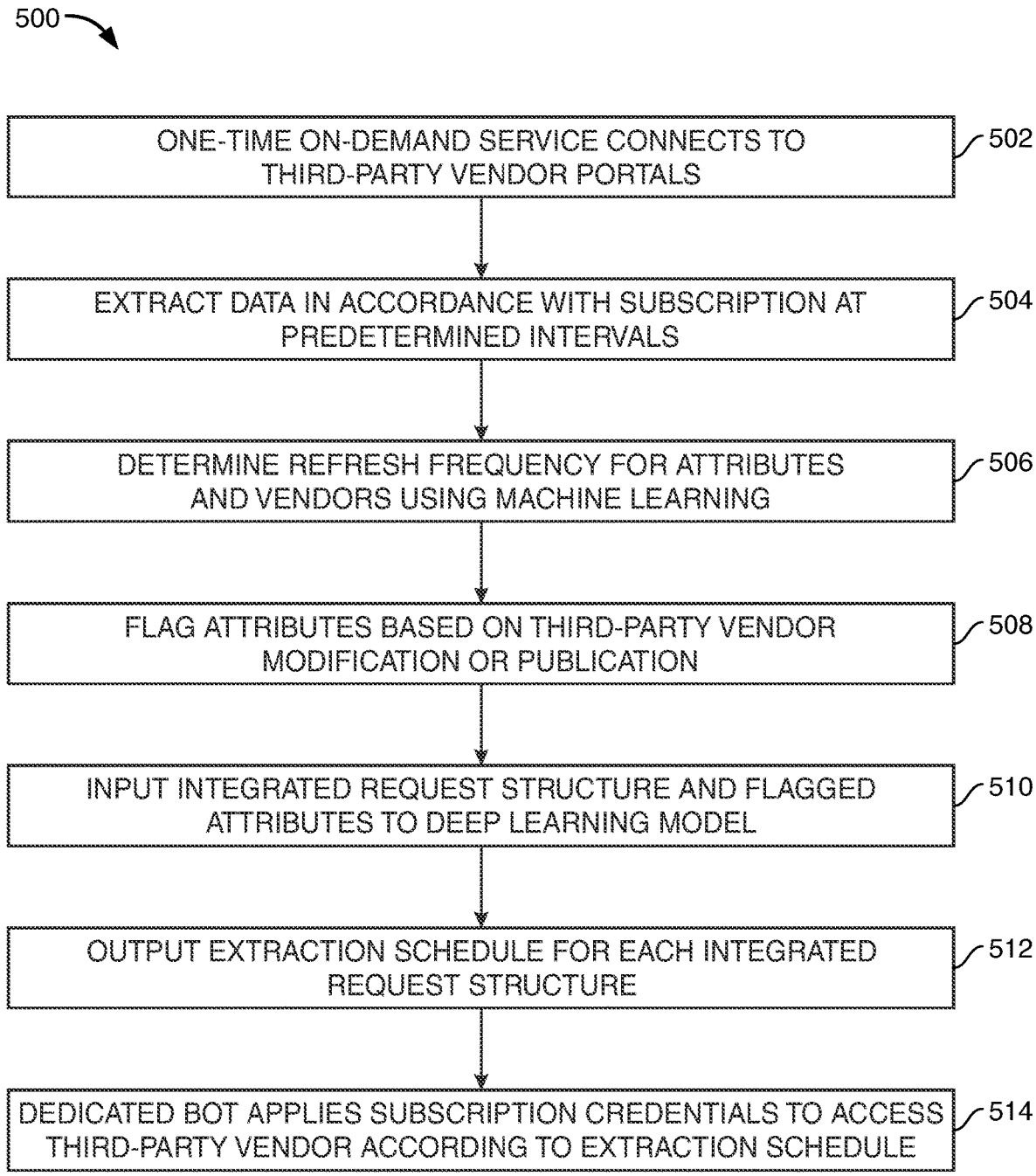
FIG. 5 shows an illustrative process flow in accordance with principles of the disclosure.

FIG. 5 shows illustrative process flow 500 for ensuring access to high quality third-party data. Elements of process flow 500 may correspond to elements of process flow 300, shown in FIG. 3.

At 502, a microservices unit may connect to the third-party vendor portals. At 504, the unit may extract data in accordance with each vendor subscription at a set of predetermined intervals. At step 506, the extracted data may be input to a first set of machine learning algorithms to determine refresh frequency for each attribute and each vendor. At step 508, the machine learning algorithms may flag each attribute based on patterns of data publication or modification by the vendors.

At step 510, the integrated request structure and the flagged attributes may be input to a second set of machine learning algorithms. At step 512, the algorithms may output an extraction schedule for each integrated request structure. At step 514, a bot dedicated to a particular vendor may apply subscription credentials to execute the integrated request according to the extraction schedule.

Thus, methods and apparatus for an OPTIMIZED SUBSCRIPTION ACCESS PLATFORM USING DNA COMPUTING are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for using a DNA computing platform to integrate access to external vendor data, the method comprising:
    receiving requests for external vendor data from a plurality of enterprise applications;
    for each request:
        tagging a request structure with a nonfungible token (NFT) linking the request to a corresponding application; and
        synthesizing a DNA strand comprising a set of bases encoding one or more attributes associated with the request structure;
    clustering the strands of DNA based at least in part on the attributes;
    converting a cluster of DNA strands to digital data;
    generating an integrated request structure for an external vendor from the digital DNA data;
    generating an integrated response structure comprising data extracted from the external vendor in accordance with the interactive request structure;
    mapping the integrated response structure to the DNA strands;
    decoding each DNA strand to identify an encoded request; and routing a response to an application based on the NFT linkage associated with the request.

2. The method of claim 1, further comprising:
using machine learning, determining an update frequency for attributes extracted from an external vendor; and
flagging one or more of the attributes with the update frequency.

3. The method of claim 2, further comprising, using machine learning, scheduling an integrated request for an external vendor based at least in part on the flagged attributes.

4. The method of claim 3, further comprising, using a bot-applicator:
accessing an external vendor at the scheduled time;
extracting data in accordance with the integrated request; and
generating the integrated response structure from the extracted data.

5. The method of claim 4, further comprising:
configuring a different bot-applicator for each external vendor; and
managing the bot-applicators with a bot-orchestrator.

6. The method of claim 1, further comprising storing the DNA strands and the integrated request structure in DNA-based renewable storage.

7. The method of claim 1, further comprising processing requests received from the applications at predetermined intervals.

8. One or more non-transitory computer-readable media storing computer-executable instructions which, when executed by a processor on a computer system, perform a method for integrating access to third-party data for a plurality of applications using DNA computing, the method comprising:
receiving requests for third-party data from a plurality of applications;
tagging each request with a nonfungible token (NFT) linking the request to a corresponding application;
for each request, synthesizing a DNA strand comprising a set of bases corresponding to one or more attributes associated with the request structure;
clustering the strands of DNA based at least in part on the attributes;
encoding the DNA cluster as digital data;
generating a consolidated request structure for a third-party vendor from the digital data;
generating a consolidated response structure comprising data extracted from the third-party vendor, the consolidated response structure corresponding to the consolidated request structure;
mapping the consolidated response structure to the DNA strands;
decoding the DNA strands to identify requests; and
routing a response to each of the plurality of applications based on the NFT linkage associated with a request.

9. The media of claim 8, further comprising:
using machine learning, determining a publication frequency for attributes extracted from a third-party vendor; and
flagging the attributes with publication frequency data.

10. The media of claim 9, the method further comprising, using machine learning, scheduling a consolidated request for a third-party vendor based at least in part on the flagged attributes.

11. The media of claim 10, the method further comprising, using a bot-applicator:
accessing a third-party vendor at the scheduled time;
extracting data corresponding to the consolidated request; and
generating the consolidated response structure from the extracted data.

12. The media of claim 11, the method further comprising:
configuring a different bot-applicator for each third-party vendor; and
managing the bots with a bot-orchestrator.

13. The media of claim 8, the method further comprising storing the DNA strands and the consolidated request structure in DNA-based renewable storage.

14. A system for using DNA computing to integrate user access to third-party data, the system comprising:
a streaming pipeline configured to receive requests for third-party data from a plurality of enterprise applications;
a processor configured to tag each request structure with a nonfungible token (NFT) linking the request to a corresponding application; and
a DNA computing platform configured to:
for each request, synthesize a DNA strand comprising a set of bases encoding one or more attributes associated with the request structure;
cluster the strands of DNA based at least in part on the attributes;
encode a DNA cluster as digital data;
generate an integrated request structure for a third-party vendor from the digital data encoding the DNA cluster;
generate an integrated response structure comprising subscription data extracted from the third-party vendor in accordance with the integrated request structure; and
map the integrated response structure to the DNA strands for each request;
the streaming pipeline further configured to route a mapped response to an application using the NFT linkage associated with a request.

15. The system of claim 14, further comprising a microservices unit configured to:
using machine learning, determine a refresh frequency for attributes extracted from a third-party vendor; and
flag the attributes with refresh frequency data.

16. The system of claim 15, the microservices unit further configured to, using machine learning, schedule an integrated request for a third-party vendor based at least in part on the flagged attributes.

17. The system of claim 16, further comprising, a bot-applicator configured to:
access a third-party vendor at a scheduled time;
extract data according to the integrated request; and
generate the integrated response structure from the extracted data.

18. The system of claim 17, further comprising a bot-orchestrator configured to manage a different bot-applicator for each third-party vendor.

19. The system of claim 14, further comprising DNA-based renewable storage configured to store the DNA strands and the DNA cluster.

20. The system of claim 14, the DNA computing platform configured to synthesize DNA strands for multiple requests in parallel.

* * * * *